United States Patent
Frey et al.

(10) Patent No.: US 8,984,575 B2
(45) Date of Patent: Mar. 17, 2015

(54) MEDIA PACKAGING

(71) Applicant: Viacom International Inc., New York, NY (US)

(72) Inventors: Stewart Alan Frey, Croton on Hudson, NY (US); Vitaliy Vaysberg, Culver City, CA (US); Francis Henry Dillon, IV, Maplewood, NJ (US); Matthew Joseph Wood, Saugus, CA (US)

(73) Assignee: Viacom International Inc., New York, NY (US)

( * ) Notice: Subject to any disclaimer, the term of this patent is extended or adjusted under 35 U.S.C. 154(b) by 64 days.

(21) Appl. No.: 13/622,881

(22) Filed: Sep. 19, 2012

(65) Prior Publication Data

US 2014/0082684 A1    Mar. 20, 2014

(51) Int. Cl.
*H04N 7/173*    (2011.01)
*H04N 21/23*    (2011.01)

(52) U.S. Cl.
CPC .................................... *H04N 21/23* (2013.01)
USPC ......................................................... 725/116

(58) Field of Classification Search
None
See application file for complete search history.

(56) References Cited

U.S. PATENT DOCUMENTS

| | | | |
|---|---|---|---|
| 2007/0186259 A1* | 8/2007 | Pedlow et al. | 725/120 |
| 2009/0165037 A1* | 6/2009 | Van De Pol et al. | 725/32 |
| 2010/0223327 A1* | 9/2010 | Srivastava et al. | 709/203 |
| 2012/0036365 A1* | 2/2012 | Kyslov et al. | 713/176 |

* cited by examiner

*Primary Examiner* — Nathan Flynn
*Assistant Examiner* — William J Kim
(74) *Attorney, Agent, or Firm* — Fay Kaplun & Marcin, LLP (57) ABSTRACT

Described are methods, systems, and apparatus, including computer program products for packaging media. In some embodiments, the technology relates to a computer-implemented method of packaging media files. A list of one or more media asset IDs is received by a media packaging server. A packaging template is received by the media packaging server. One or more media files based on a media asset ID in the list of the one or more media asset IDs and the packaging template are retrieved, by the media packaging server. Metadata associated with the media asset ID based on the packaging template is retrieved by the media packaging server. The one or more media files and the metadata are packaged by the media packaging server into a delivery package in a packaging format indicated by the packaging template.

25 Claims, 7 Drawing Sheets

```
<TEMPLATE>
. . . .
<Video Format>MPEG 2</Video Format>          ——— 310
<Video Resolution>720p </Video Resolution>   ——— 315
<Audio Language>English</Audio Language>     ——— 320
<Subtitle Language>French</Subtitle Language> ——— 325
<Subtitle Language>Spanish</Subtitle Language> ——— 330
<Package Format>TAR</Package Format>         ——— 335
<Delivery Destination>
    <Server Information/>                    ——— 340
</Delivery Destination>
. . . .
</TEMPLATE>
```

MEDIA PACKAGING

FIELD OF THE TECHNOLOGY

The present technology relates generally to media packaging and delivery, and, more specifically, to packaging digital media and related files in accordance with a template for delivery.

BACKGROUND

Content producers, such as producers of movies, television shows, and other media content, often produce media content that is licensed by content customers such as cable television providers, Video-on-Demand services, streaming services, etc. The content producers can provide digital versions of media titles (e.g., movies, television show episodes, etc.) to these customers. These customers commonly request multiple media titles at a time (e.g., lists of several movies, seasons of television shows, etc.) from the content producers. For example, an online video streaming service might wish to obtain 100 media titles (e.g., movies) from a movie studio. The online video streaming service might want 100 specifically-identified media titles (e.g., specific movies), or any 100 of the movie studio's media titles, or a mixture of the two. The movie studio can then collect digital versions of the media titles and provide them to the online video streaming service.

Providing digital versions of the media titles to the customer can create challenges for the content producer. Digital versions of media titles can include multiple media files. For example, a digital version of a movie can include one or more video files, one or more audio files (e.g., dialog tracks, background audio, etc.), subtitle files, and metadata files containing information about the movie (e.g., listings of the cast, credits, runtime, etc.). In addition to the challenges presented by providing a large number of media titles, individual customers can have separate requirements for the formats of the digital versions, the language of the dialog tracks and/or subtitle tracks, how the digital versions are packaged, and how the digital versions are delivered. Past approaches involved manually collecting the files for the digital versions of the requested media titles pursuant to the individual customer's requirements, which is time consuming and inefficient.

SUMMARY OF THE INVENTION

With the content customers' increased demand for digital media content, there is a need for an efficient way to collect, package, and deliver digital versions of media titles in a manner specified by the customer. The present technology can provide efficient media packaging and delivery.

In one aspect, there is a computer-implemented method of packaging media files. The method can include receiving, by a media packaging server, a list of one or more media asset IDs. The method can include receiving, by the media packaging server, a packaging template. The method can include retrieving, by the media packaging server, one or more media files based on a media asset ID in the list of the one or more media asset IDs and the packaging template. The method can include retrieving, by the media packaging server, metadata associated with the media asset ID based on the packaging template. The method can include packaging, by the media packaging server, the one or more media files and the metadata into a delivery package in a packaging format indicated by the packaging template.

In some embodiments, the method can include retrieving, by the media packaging server, a second one or more media files based on a second media asset ID in the list of the one or more media asset IDs. The method can include retrieving, by the media packaging server, second metadata associated with the second media asset ID based on the packaging template. The method can include packaging, by the media packaging server, the second one or more media files and the second metadata into the delivery package in the packaging format indicated by the packaging template.

In some embodiments, the method can include reformatting at least one of the media files based on the packaging template. Reformatting at least one of the media files based on the packaging template can include transcoding the at least one of the media files into a format indicated by the packaging template. The method can include transmitting, by the media packaging server, the delivery package via a network specified by the template. The method can include storing, by the media packaging server, the delivery package to a non-transient storage medium specified by the template.

In some embodiments, the method includes generating, by the media packaging server, a manifest identifying the one or more media files and the metadata in the delivery package; and packaging, by the media packaging server, the manifest into the delivery package.

In some embodiments, the metadata can include one or more of format information, runtime information, subtitle information, or closed-caption information related to the one or more media files. The one or more media files can include at least one video file and at least one audio file that relate to the same audio-visual presentation.

In some embodiments, the method can include compressing the delivery package in a compression format specified in the packaging template. The method can include encrypting the delivery package in an encryption format specified in the packaging template.

In another aspect, there is a computer program product, tangibly embodied in a non-volatile computer-readable storage medium, for packaging media files. The computer program product can include instructions being operable to cause a data processing apparatus to: receive a list of one or more media asset IDs; receive a packaging template; retrieve one or more media files based on a media asset ID in the list of the one or more media asset IDs and the packaging template; retrieve metadata associated with the media asset ID based on the packaging template; and package the one or more media files and the metadata into a delivery package in a packaging format indicated by the packaging template.

In some embodiments, the computer program includes instructions being operable to cause the data processing apparatus to: retrieve a second one or more media files based on a second media asset ID in the list of the one or more media asset IDs; retrieve second metadata associated with the second media asset ID based on the packaging template; package the second one or more media files and the second metadata into the delivery package in the packaging format indicated by the packaging template.

In some embodiments, the computer program product includes instructions being operable to cause the data processing apparatus to reformat at least one of the media files based on the packaging template. The instructions being operable to cause the data processing apparatus to reformat at least one of the media files based on the packaging template can include instructions being operable to cause the data processing apparatus to transcode the at least one of the media files into a format indicated by the packaging template. The computer program product can include instructions being operable to cause the data processing apparatus to transmit the delivery package via a network specified by the template. The computer program product can include instructions being operable to cause the data processing apparatus to store the delivery package to a non-transient storage medium specified by the template.

In some embodiments, the computer program product can include instructions being operable to cause the data processing apparatus to: generate a manifest identifying the one or more media files and the metadata in the delivery package; and package the manifest into the delivery package.

In some embodiments, the metadata can include one or more of format information, runtime information, subtitle information, or closed-caption information related to the one or more media files. The one or more media files can include at least one video file and at least one audio file that relate to the same audio-visual presentation.

In some embodiments, the computer program product can include instructions being operable to cause the data processing apparatus to compress the delivery package in a compression format specified in the packaging template. The computer program product can include instructions being operable to cause the data processing apparatus to encrypt the delivery package in an encryption format specified in the packaging template.

In another aspect, there is a computer-implemented method of packaging media files. The method can include receiving, by a media packaging server, a list of one or more media asset IDs. The method can include receiving, by the media packaging server, a packaging template. The method can include determining, by the media packaging server, whether one or more media files associated with a media asset ID in the list of the one or more media asset IDs are available based on the packaging template. The method can include retrieving, by the media packaging server, the one or more media files if the one or more media files are available. The method can include retrieving, by the media packaging server, metadata associated with the media asset ID based on the packaging template if the one or more media files are available. The method can include packaging, by the media packaging server, the one or more media files and the metadata into a delivery package in a packaging format indicated by the packaging template if the one or more media files are available.

In some embodiments, the method can include displaying on a display device the media asset ID if the one or more media files are not available. The method can include receiving, by the media packaging server, a second media asset ID via a user interface to replace the first media asset ID.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In some embodiments, the technology provides computer-implemented methods and systems that can collect, package, and/or deliver digital media content based on a customer's specified requirements. The technology can allow a content producer to programmatically collect, assemble, package, and deliver a package of media files and metadata associated with the desired media titles to a customer based on the customer's list of desired media titles and a template indicating how the media are to be assembled, packaged, and delivered.

As an example, a media title can be a specific movie. The movie can have one or more media files or media files associated with it. For example, a digital version of a movie can include one or more video files, one or more audio files (e.g., dialog tracks, background audio, etc.), subtitle files, pictures, promotional materials, stills, and metadata files containing information about the movie (e.g., listings of the cast, credits, runtime, etc.). For example, the video portion of the movie can be stored in one media file in 1080p resolution and in a different media file in 720p resolution. As another example, an English dialog track for the movie can be stored in one media file and a French dialog track for the movie can be stored in a different media file.

The technology can facilitate packaging and delivering media files associated with media titles. As an example of the technology, a user can provide to a media packaging server a list identifying media titles or assets (e.g., a list of movies) desired by a customer. The user can also provide to the media packaging server a template identifying various requirements of the customer. For example, the template can specify that the customer wants digital versions of the media titles in MPEG 4 format and 1080p resolution, with an English dialogue track and Spanish and French subtitles. The template can also specify that the customer wants the digital versions of the media titles encrypted and uploaded to the customer's file server. With this information, the media packaging server can collect one or more media files associated with each media title or asset that conforms with the client's requirements (e.g., one or more files with the video portion of the movie in the proper format and resolution, one or more files with the audio portion of the movie in the proper language, and one or more files with the subtitles in the proper languages). The media server can package the files for all of the media titles, encrypt them, and upload the package to the client's file server.

Figure 1:
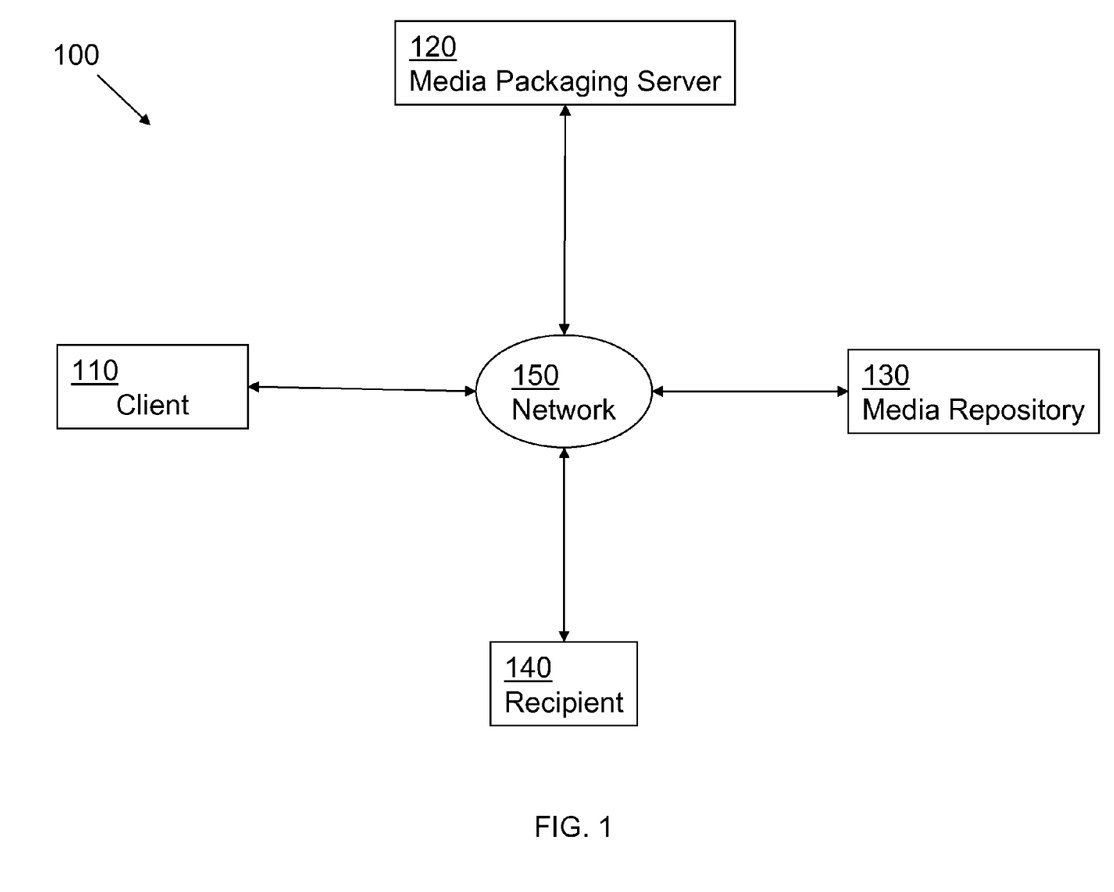
FIG. 1 depicts an exemplary system for packaging media files.

Turning to the illustrated embodiments, FIG. 1 depicts an exemplary system 100 for packaging media files. System 100 includes client 110, media packaging server 120, media repository 130, and recipient 140. Client 110, media packaging server 120, media repository 130, and recipient 140 of system 100 can be connected via network 150. Examples of networks include a bus, a local area network (LAN), a wide area network (WAN), the Internet, wired networks, wireless networks, a packet-based network, and/or a circuit-based network.

In some embodiments, network 150 can include one or more sub-networks (not shown). For example, client 110 can be connected to a private network along with media packaging server 120 and media repository 130. Media packaging server 120 can be connected to a public network along with recipient 140. In such an embodiment, media packaging server 120 can provide the packaged media to recipient 140 without recipient 140 being on the same network as client 110 and media repository 130. It should be appreciated that other network topologies can be used in accordance with the technology disclosed herein.

Client 110, media packaging server 120, media repository 130, and client 140 can each be any computing device, including, for example, a server, personal computer, smart phone, PDA, or tablet. While the illustrated embodiment depicts Client 110, media packaging server 120, media repository 130, and client 140 as separate computing devices, in some embodiments two or more of client 110, media packaging server 120, and media repository 130 can be modules executing on the same computing device.

In some embodiments, media packaging server 120 can package and deliver media files in accordance with the methods described herein. For example, Media packaging server 120 can retrieve medial files from media repository 130, package the media files, and deliver the media files to recipient 140.

Media repository 130 can store and access media files associated with media titles. As described above, media files can be digital files or computer files representing portions of media titles. In some embodiments, each media title (e.g., specific movie, tv episode, etc.) is assigned a media asset ID. Media files for a particular title can be associated with the media asset ID for that media title. The various media files (e.g., high resolution video file, low resolution video file, English dialog track, etc.) for a particular title can be located based on the title's media asset ID. Beneficially, specific files for a media title can be requested from media repository 130 based on a media asset ID.

A media asset ID can be an alphanumeric string. In some embodiments, the characters of a media asset ID relate to the media content of the associated media title, such as including indicia of the show, season, and episode. A media asset ID can uniquely identify a media title within system 100. For example, a particular movie is associated with a media asset ID, along with the various media files containing portions of that movie.

Figure 2:
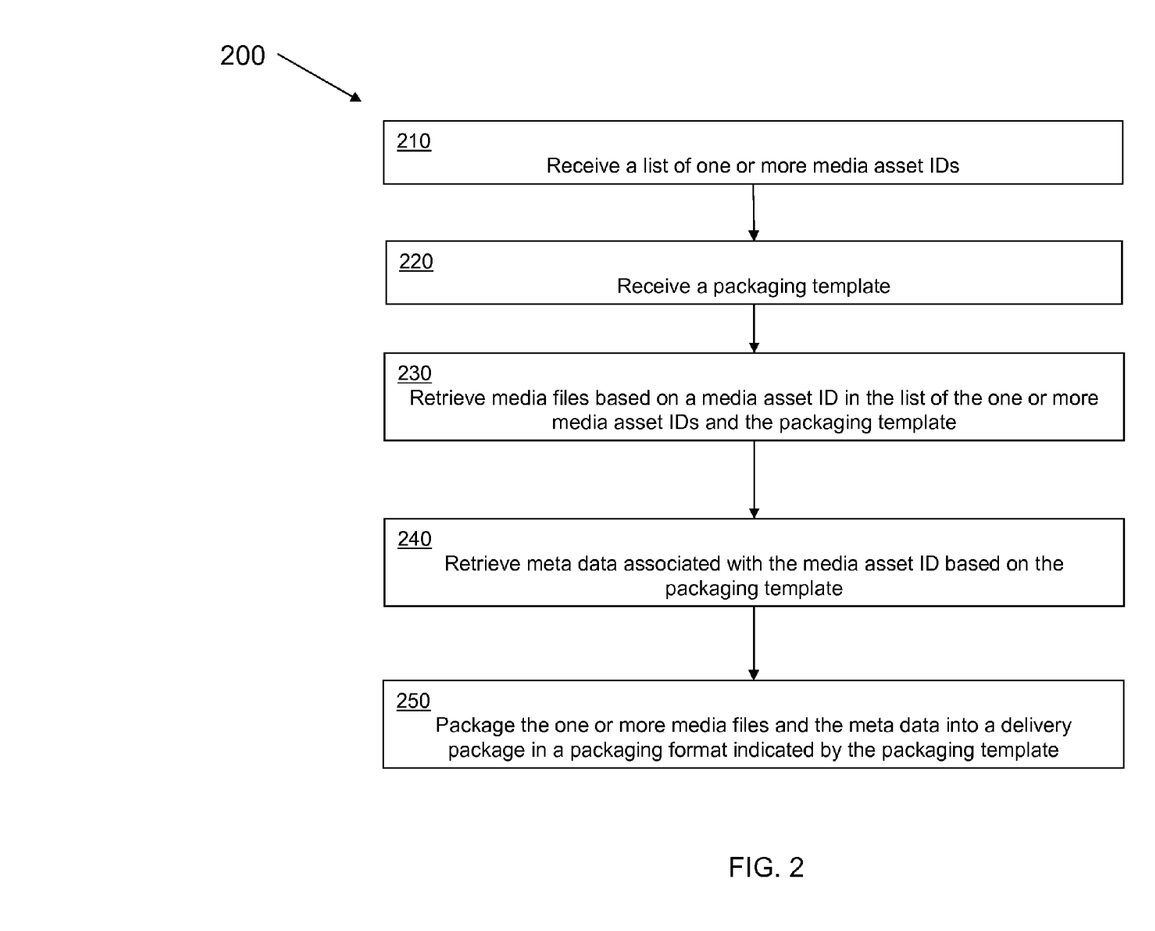
FIG. 2 is a flow chart illustrating an exemplary computer implemented method of packaging media files.

FIG. 2 is a flow chart 200 illustrating an exemplary computer implemented method of packaging media files. In some embodiments, system 100 of FIG. 1 can be used to implement the method illustrated in flow chart 200.

At step 210, a list of one or more media asset IDs is received. For example, media packaging server 120 can receive a list of one or more media asset IDs from client 110 via network 150. In other embodiments, media packaging server 120 can receive the list of one or more media asset IDs from a local disk drive, network storage, or a database. In the exemplary embodiment, the list of media asset IDs can indicate media titles for which media files should be collected. As discussed above, each media title (e.g., specific movie, tv episode, etc.) can be assigned a media asset ID and the media files for each title can be associated with the media asset ID for that media title. The list of one or more media asset IDs can be in any format readable by media packaging server 120. For example, the list of one or more media asset IDs can be in XML, plain text, or binary.

At step 220, a packaging template is received. In some embodiments, media packaging server 120 can receive a packaging template from client 110 via network 150. In some embodiments, media packaging server 120 can receive the packaging template from a local disk drive, network storage, or a database.

A packaging template can specify one or more aspects of how media files should be packaged for a customer. For example, a packaging template can specify the video format in which media files should be delivered, such as MPEG 2 or MPEG 4. A packaging template can specify the resolution for the video media files, such as 720p or 1080p. A packaging template can specify the dialogue track language or languages that should be delivered, such as English, French, and/or Spanish. A packaging template can specify the subtitle language or languages that should be delivered, such as English, French, and/or Spanish. A packaging template can specify whether the packaged files should be compressed, encrypted, and/or packaged as a TAR file. A packaging template can specify how the packaged files should be delivered, such as on a disk or uploaded to a file server.

Figure 3:
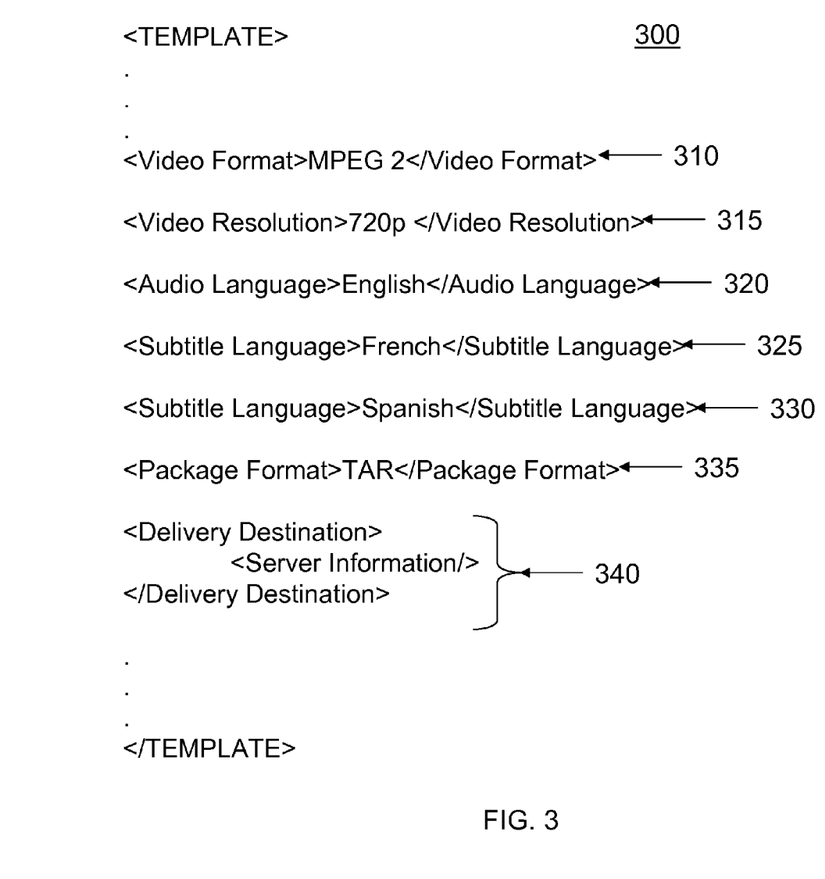
FIG. 3 illustrates a portion of a packaging template 300 written in XML.

The packaging template can be in any format readable by media packaging server 120. For example, the packaging template can be in XML, plain text, or binary. FIG. 3 illustrates a portion of a packaging template 300 written in XML. In the illustrated example, packaging template 300 specifies the video format in which media files should be delivered is MPEG 2 (line 310). Packaging template 300 specifies the resolution for the video media files is 720p (line 315). Packaging template 300 specifies the dialogue track language that should be delivered is English (line 320). Packaging template 300 specifies the subtitle languages that should be delivered include French and Spanish (lines 325 and 330). Packaging template 300 specifies the packaged files should be packaged as a TAR file (line 335). Packaging template 300 specifies the packaged files should be delivered to a server (line 340). The sever information can include the server's IP address, protocol, and authentication information.

Returning to FIG. 2, at step 230, media files are retrieved based on a media asset ID in the list of the one or more media asset IDs and the packaging template. For example, media packaging server 120 can retrieve media files from media repository 130 based on the media asset ID and the packaging template. Media packaging server 120 can request from media repository 130 the media files associated with the media asset that satisfy the requirements specified in the template (e.g., media file format, resolution, language, etc.). As an example, the media asset ID can correspond to a specific movie and the template can specify that video media files should be in MPEG 4 format and 1080P resolution; the dialogue track should be in English; and French subtitles should be included. Media packaging server 120 can request from media repository 130 the media files for the specific movie (using its corresponding media asset ID) that are in the MPEG 4 format and encoded in 1080P; the media files for the English dialog track; and the media file for the French subtitles.

At step 240, metadata associated with the media asset ID are retrieved based on the packaging template. For example, media packaging server 120 can retrieve metadata associated with the media asset ID from media repository 130 based on the packaging template. The template can specify metadata that should be included with the packaged media files. For example, the template can specify that each media asset's run time, producer, cast, production studio, release date, etc. should be packaged with the media files.

At step 250, the one or more media files and the metadata are packaged into a delivery package in a packaging format indicated by the packaging template. For example, media packaging server 120 can package the one or more media files and the metadata into a delivery package in a packaging format indicated by the packaging template. In some embodiments, the template can specify the packaged media files should be encrypted and put in a TAR file. Media packaging server 120 can package the media files retrieved in step 230 and the metadata retrieved in step 240 into an encrypted TAR file.

In some embodiments, the delivery package can be delivered to a location specified in the template. In some embodiments, the packaging template can specify the delivery package should be sent to a server (e.g., recipient 140). Media packaging server 120 can send the delivery package to recipient 140, which can be, for example, an FTP server. In some embodiments, media packaging server 120 can store the delivery package to a storage medium, such as a hard drive or optical medium.

FIG. 4A-FIG. 4D are a flow chart 400 illustrating an exemplary computer-implemented method of packaging media files. In some embodiments, the method illustrated in FIG. 4A-FIG. 4D can be performed by media packaging server 120 of FIG. 1.

Figure 4A:
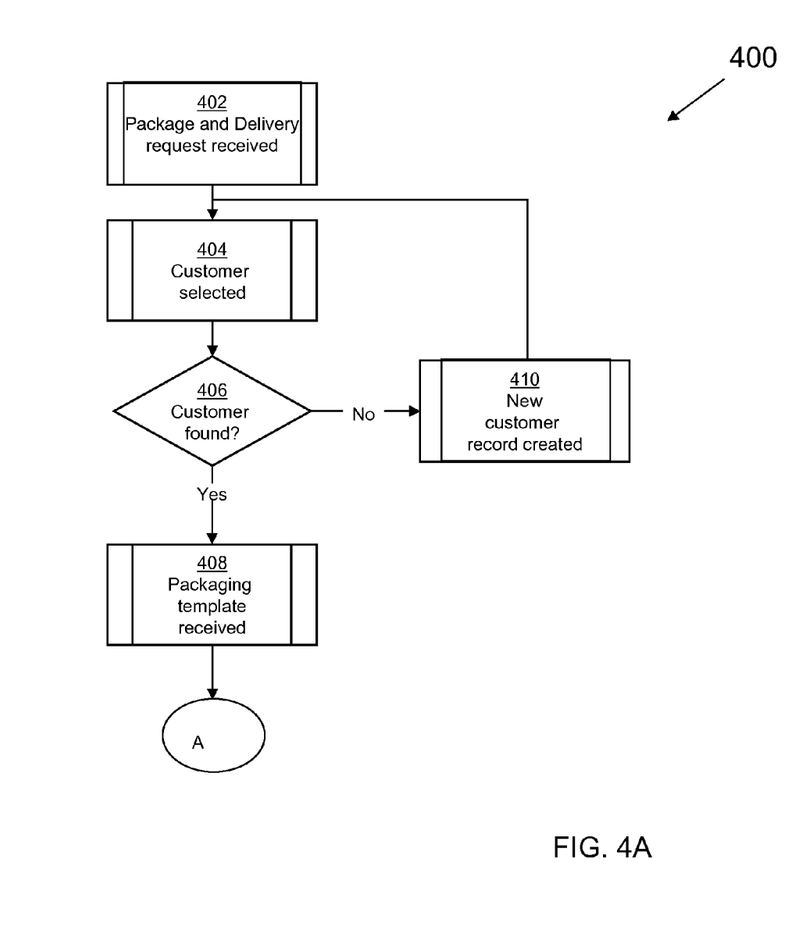
FIG. 4A-FIG. 4D are a flow chart illustrating an exemplary computer-implemented method of packaging media files.

At step 402, a package and delivery request is received (e.g., a list of one or more media asset IDs). At step 404, a customer (e.g., a cable provider, video-on-demand provider, etc.) is selected. In some embodiments, the customer can be selected based on the package and delivery request (e.g., the package and delivery request can include an identification of the customer). In some embodiments, the customer can be selected based on human input through a graphical user interface.

At step 406, it is determined whether a record for the customer is found. If a record for the customer is found, the method proceeds to step 408. If a record for the customer is not found, a record for the customer is created at step 410. In some embodiments, the customer record can be created based on the package and delivery request (e.g., the package and delivery request can include customer information). In some embodiments, the customer record can be created based on human input through a graphical user interface.

At step 408, a packaging template is received. In some embodiments, the packaging template can be received from a local disk drive, network storage, or a database. In some embodiments, the packaging template can be received based on human input or selection through a graphical user interface.

Figure 4B:
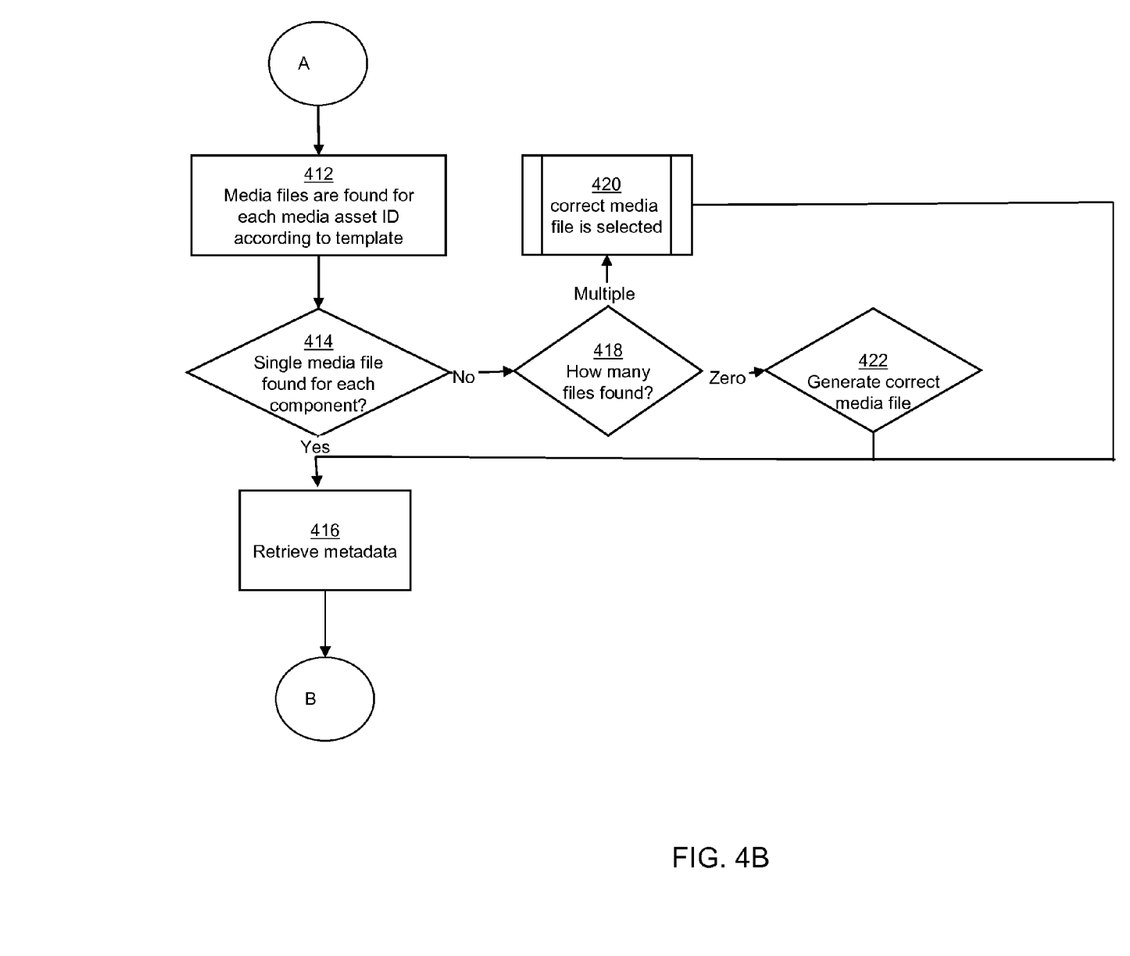

At step 412, media files are retrieved for each media asset ID in the list of media asset IDs in the packaging and delivery request according to the rules specified in the packaging template. At step 414, it is determined if a single media file is found for each component specified in the template (e.g., video, English dialogue track, etc.) of each media title. If a single media file is found for each component, the method proceeds to step 416. If a single media file is not found for each component, the number of media files found is determined at step 418.

If multiple media files for a component are found, the correct media file is selected at step 420. In some embodiments, the correct media asset can be selected based on human input through a graphical user interface. After the correct medial file is selected, the method proceeds to step 416.

If no media files are found for a component, the method proceeds to step 422. At step 422, a media file conforming to the template is generated. For example, if the template specifies that video media files should be in low resolution, a low resolution video media file can be generated from a high resolution video media file associated with the same media asset ID. After the correct media file is generated, the method proceeds to step 416.

Figure 4C:
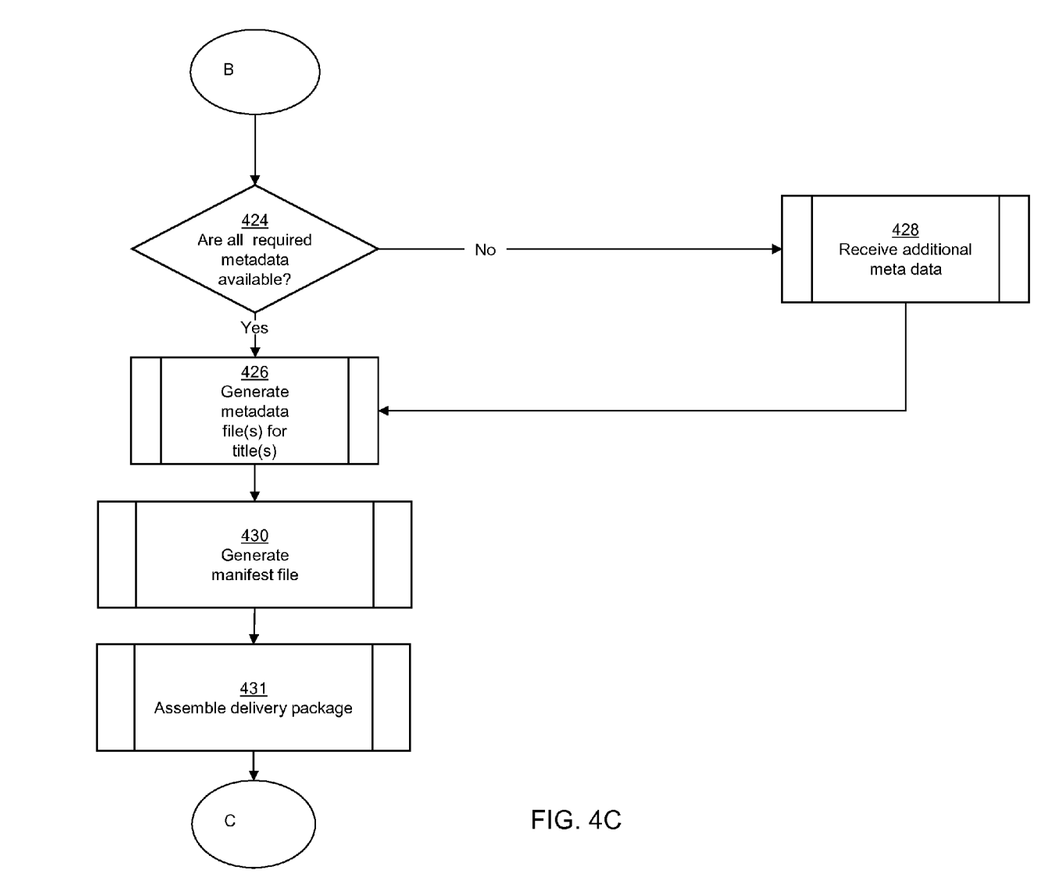

At step 416, metadata is retrieved. At step 424, it is determined whether all of the metadata is available. If all of the metadata is available, the method proceeds to step 426. If all of the metadata is not available, the method proceeds to step 428. At step 428, additional metadata is received. In some embodiments, the additional metadata can be received from an external source, such as a website or database containing metadata. In some embodiments, the additional metadata can be received as a result of human input through a graphical user interface.

At step 426, metadata files are generated for the media titles (e.g., for each media asset ID). The metadata files can be generated in a format specified by the packaging template. In some embodiments, the sequence of fields (e.g., title, release, runtime) can be specified. In some embodiments, the packaging template can specify whether the metadata is in XML and/or the XML schema.

At step 430, a manifest file is generated. The manifest can provide a list of all the files being packaged (e.g., media files, metadata files, etc.).

At step 431, a delivery package is assembled. In some embodiments, the delivery package includes the collected media files, metadata files, and manifest file.

Figure 4D:
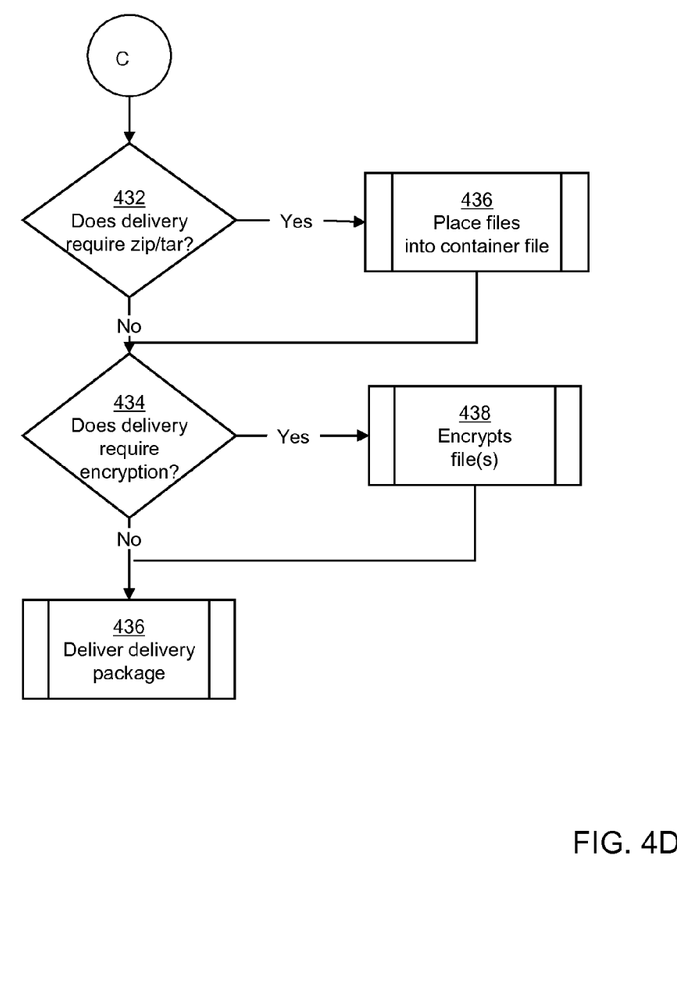

At step 432, it is determined whether the delivery package (e.g., media files, metadata files, and manifest file) should be packaged into a container file. For example, the packaging template can specify the delivery package should be placed in a TAR file. If the delivery package should not be placed into a container file, the method proceeds to step 434. If the delivery package should be placed into a container file, the delivery package is placed into a container file, as specified in the packaging template, at step 436.

At step 434, it is determined whether encryption is required. If encryption is not required by the packaging template, the method proceeds to step 436. If encryption is required, the delivery package is encrypted at step 438.

At step 436, the delivery package is delivered. The delivery package is delivered as specified in the template. In some embodiments, the delivery package can be delivered to a server specified in the template. For example, the delivery package can be delivered to a location specified in the template (e.g., uploaded to an file server specified in the template, published in a shared directory, etc.). In some embodiments, the delivery package can be sent to a storage medium, such as a hard drive or optical medium.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The embodiments described herein are examples for illustration only and not to limit the technology in any way. The steps of the technology can be performed in a different order and still achieve desirable results. Other embodiments are within the scope of the following claims.

What is claimed is:

1. A computer-implemented method of packaging media files comprising:
   receiving, by a media packaging server, a request from a user via a client device, the request including a media asset ID identifying a media file requested by the user of the client device and a packaging template, the packaging template identifying requested metadata associated with the media asset ID and a format for the media file and metadata requested by the user of the client device;
   retrieving, by the media packaging server, a media file and metadata matching the media asset ID and metadata in the request in the format indicated in the packaging template; and
   generating, by the media packaging server, a delivery package including the retrieved media file and metadata for transmission to the client device.

2. The method of claim 1, further comprising:
   receiving, by the media packaging server, a further request from the client device, the further request including a further media asset ID identifying a further media file requested by the client device and a further packaging template, the further packaging template identifying further requested metadata associated with the further media asset ID and a further format for the further media file and metadata requested by the client device;
   further retrieving, by the media packaging server, a media file and metadata matching the further media asset ID and metadata in the further request in the further format indicated in the further packaging template;
   including, by the media packaging server, the further retrieved media file and metadata into the delivery package.

3. The method of claim 1, further comprising:
   reformatting the media file in a first format to a second format, the second format being the format indicated in the packaging template.

4. The method of claim 3, wherein reformatting the media file based on the packaging template comprises transcoding the media file into the format indicated by the packaging template.

5. The method of claim 1, wherein the packaging template indicates a requested network for the transmission of the delivery package, the method further comprising:
   transmitting, by the media packaging server, the delivery package via the requested network.

6. The method of claim 1, wherein the packaging template indicates a requested non-transient storage medium for storing the delivery package, the method further comprising:
   storing, by the media packaging server, the delivery package to the requested non-transient storage medium.

7. The method of claim 1, further comprising:
   generating, by the media packaging server, a manifest identifying the retrieved media file and metadata in the delivery package; and
   including, by the media packaging server, the manifest into the delivery package.

8. The method of claim 1, wherein the metadata comprises at least one of format information, runtime information, subtitle information, and closed-caption information associated with the media file.

9. The method of claim 1, wherein the packaging template indicates a requested compression format for compressing the delivery package, the method further comprising:
   compressing the delivery package in the requested compression format.

10. The method of claim 1, wherein the media file comprises at least one video file and at least one audio file that relate to the same audio-visual presentation.

11. The method of claim 1, wherein the packaging template indicates a requested encryption format for encrypting the delivery package, the method further comprising:

encrypting the delivery package in the requested encryption format.

12. A computer program product, tangibly embodied in a non-volatile computer-readable storage medium, for packaging media files, the computer program product including instructions being operable to cause a data processing apparatus to:
receive a request from a user via a client device, the request including a media asset ID identifying a media file requested by the user of the client device and a packaging template, the packaging template identifying requested metadata associated with the media asset ID and a format for the media file and metadata requested by the user of the client device;
retrieve a media file and metadata matching the media asset ID and metadata in the request in the format indicated in the packaging template; and
generate a delivery package including the retrieved media file and metadata for transmission to the client device.

13. The computer program product of claim 12, further including instructions being operable to cause the data processing apparatus to:
receive a further request from the client device, the further request including a further media asset ID identifying a further media file requested by the client device and a further packaging template, the further packaging template identifying further requested metadata associated with the further media asset ID and a further format for the further media file and metadata requested by the client device;
further retrieve a media file and metadata matching the further media asset ID and metadata in the further request in the further format indicated in the further packaging template;
include the further retrieved media file and metadata into the delivery package.

14. The computer program product of claim 12, further including instructions being operable to cause the data processing apparatus to:
reformat the media file in a first format to a second format, the second format being the format indicated in the packaging template.

15. The computer program product of claim 14, wherein the instructions being operable to cause the data processing apparatus to reformat the media file based on the packaging template comprise instructions being operable to cause the data processing apparatus to transcode the media file into the format indicated by the packaging template.

16. The computer program product of claim 12, wherein the packaging template indicates a requested network for the transmission of the delivery package, the computer program product further including instructions being operable to cause the data processing apparatus to:
transmit the delivery package via the requested network.

17. The computer program product of claim 12, wherein the packaging template indicates a requested non-transient storage medium for storing the delivery package, the computer program product further including instructions being operable to cause the data processing apparatus to:
store the delivery package to the requested non-transient storage medium.

18. The computer program product of claim 12, further including instructions being operable to cause the data processing apparatus to:
generate a manifest identifying the media file and metadata in the delivery package; and
include the manifest into the delivery package.

19. The computer program product of claim 12, wherein the metadata comprises at least one of format information, runtime information, subtitle information, and closed-caption information associated with the media file.

20. The computer program product of claim 12, wherein the packaging template indicates a requested compression format for compressing the delivery package, the computer program product further including instructions being operable to cause the data processing apparatus to:
compress the delivery package in the requested compression format.

21. The computer program product of claim 12, wherein the media file comprises at least one video file and at least one audio file that relate to the same audio-visual presentation.

22. The computer program product of claim 12, wherein the packaging template indicates a requested encryption format for encrypting the delivery package, the computer program product further including instructions being operable to cause the data processing apparatus to:
encrypt the delivery package in the requested encryption format.

23. A computer-implemented method of packaging media files comprising:
receiving, by a media packaging server, a request from a user via a client device, the request including a media asset ID identifying a media file requested by the user of the client device and a packaging template, the packaging template identifying requested metadata associated with the media asset ID and a format for the media file and metadata requested by the user of the client device;
determining, by the media packaging server, whether the media file in the requested format indicated in the packaging template is available;
retrieving, by the media packaging server, a media file and metadata matching the media asset ID and metadata in the request in the format indicated in the packaging template if available; and
generating, by the media packaging server, a delivery package including the retrieved, available media file and metadata for transmission to the client device.

24. The method of claim 23, further comprising:
displaying on a display device the media asset ID if the media file in the requested format is unavailable.

25. The method of claim 24, further comprising:
receiving, by the media packaging server, a further media asset ID via a user interface of the client device to replace the unavailable media asset ID.

\* \* \* \* \*